US006704839B2

(12) United States Patent
Butterworth et al.

(10) Patent No.: US 6,704,839 B2
(45) Date of Patent: Mar. 9, 2004

(54) DATA STORAGE SYSTEM AND METHOD OF STORING DATA

(75) Inventors: Henry Esmond Butterworth, San Jose, CA (US); Robert Bruce Nicholson, Portsmouth (GB); Douglas Turner, Bristol (GB)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 09/969,571

(22) Filed: Oct. 1, 2001

(65) Prior Publication Data

US 2002/0046322 A1 Apr. 18, 2002

(30) Foreign Application Priority Data

Oct. 14, 2000 (GB) .............................................. 0025226

(51) Int. Cl.$^7$ ............................................. G06F 12/00
(52) U.S. Cl. ..................... 711/114; 711/162; 714/6; 714/10; 714/11
(58) Field of Search ................. 711/114, 162; 714/6, 10, 11

(56) References Cited

U.S. PATENT DOCUMENTS

| | | | | |
|---|---|---|---|---|
| 4,660,106 A | * | 4/1987 | Harrison et al. ......... 360/77.08 |
| 5,519,844 A | | 5/1996 | Stallmo ........................ 395/441 |
| 5,546,535 A | * | 8/1996 | Stallmo et al. ................. 714/9 |
| 5,790,775 A | * | 8/1998 | Marks et al. .................... 714/9 |
| 6,151,659 A | * | 11/2000 | Solomon et al. ............. 711/114 |
| 6,363,462 B1 | * | 3/2002 | Bergsten ..................... 711/162 |
| 6,401,170 B1 | * | 6/2002 | Griffith et al. .............. 711/114 |
| 6,457,098 B1 | * | 9/2002 | DeKoning et al. .......... 711/114 |
| 6,578,158 B1 | * | 6/2003 | Deitz et al. ................... 714/11 |

OTHER PUBLICATIONS

M. Rosenblum et al., "The Design and Implementation of a Log Structured File System", ACM Trans. On Computer Systems, vol. 10, No. 1, Feb. 1992, pp. 26–52.
D. A. Patterson et al., "A Case for Redundant Arrays of Inexpensive Disks (RAID)", Report No. UCBICSD 87/391, Dec. 1987, Computer Sciences Division, University of California.
J. Menon, "A Performance Comparison of RAID–5 and Log–Structured Arrays", Proceedings of the Fourth IEEE International Symposium on High Performance Distributed Computing, 1995, pp. 167–178.

* cited by examiner

Primary Examiner—Hiep T. Nguyen
(74) Attorney, Agent, or Firm—Bryan W. Butler, Esq.; Harrington & Smith, LLP

(57) ABSTRACT

A data storage system and method of storing data with at least two controllers (200, 300) which share a storage space (244, 344) on an array of storage devices and which support the same set of logical upstream devices. The controllers (200, 300) share the workload by dividing the shared storage space (244, 344) into stripes where the stripes are sufficiently small to divide the workload uniformly across the storage device. This is achieved in the case of two controllers (200, 300) of a log structured array by dividing the storage space into odd and even tracks, all odd tracks being designated to one controller (300) and all even tracks to the other controller (200).

31 Claims, 2 Drawing Sheets

DATA STORAGE SYSTEM AND METHOD OF STORING DATA

FIELD OF THE INVENTION

This invention relates generally to a data storage system and a method of storing data and, more particularly, to a system and method implementing a log structured array in a storage subsystem with at least two storage controller processors controlling a shared set of direct access storage devices.

BACKGROUND OF INVENTION

A data storage subsystem having multiple direct access storage devices (DASDs) may store data and other information in an arrangement called a log structured array (LSA).

Log structured arrays combine the approach of the log structured file system architecture as described in "The Design and Implementation of a Log Structured File System" by M. Rosenblum and J. K. Ousterhout, ACM Transactions on Computer Systems, Vol. 10 No. 1, February 1992, pages 26–52 with a disk array architecture such as the well-known RAID (redundant arrays of inexpensive disks) architecture which has a parity technique to improve reliability and availability. RAID architecture is described in "A Case for Redundant Arrays of Inexpensive Disks (RAID)", Report No. UCBICSD 87/391, December 1987, Computer Sciences Division, University of California, Berkeley, Calif. "A Performance Comparison of RAID 5 and Log Structured Arrays", Proceedings of the Fourth IEEE International Symposium on High Performance Distributed Computing, 1995, pages 167–178 gives a comparison between LSA and RAID 5 architectures.

An LSA stores data to an array of DASDs in a sequential structure called a log. New information is not updated in place, instead it is written to a new location to reduce seek activity. The data is written in strides or stripes distributed across the array and there may be a form of check data to provide reliability of the data. For example, the check data may be in the form of a parity check as used in the RAID 5 architecture which is rotated across the strides in the array.

An LSA generally consists of a controller and N+M physical DASDs. The storage space of N DASDs is available for storage of data. The storage space of the M DASDs is available for the check data. M could be equal to zero in which case there would not be any check data. If M=1 the system would be a RAID 5 system in which an exclusive-OR parity is rotated through all the DASDs. If M=2 the system would be a known RAID 6 arrangement.

The LSA controller manages the data storage and writes updated data into new DASD locations rather than writing new data in place. The LSA controller keeps an LSA directory which it uses to locate data items in the array.

As an illustration of the N+M physical DASDs, an LSA can be considered as consisting of a group of DASDs. Each DASD is divided into large consecutive areas called segment-columns. If the DASDs are in the form of disks, a segment-column is typically as large as a physical cylinder on the disk. Corresponding segment-columns from the N+M devices constitute a segment. The array has as many segments as there are segment-columns on a single DASD in the array. One or more of the segment-columns of a segment may contain the check data or parity of the remaining segment-columns of the segment. For performance reasons, the check data or parity segment-columns are not usually all on the same DASD, but are rotated among the DASDs.

Logical devices are mapped and stored in the LSA. A logical track is a set of data records to be stored. The data may be compressed or may be in an uncompressed form. Many logical tracks can be stored in the same segment. The location of a logical track in an LSA changes over time. The LSA directory indicates the current location of each logical track. The LSA directory is usually maintained in paged virtual memory.

Whether an LSA stores information according to a variable length format such as a count-key-data (CKD) architecture or according to fixed block architecture, the LSA storage format of segments is mapped onto the physical storage space in the DASDs so that a logical track of the LSA is stored within a single segment.

Reading and writing into an LSA occurs under management of the LSA controller. An LSA controller can include resident microcode that emulates logical devices such as CKD or fixed block DASDs. In this way, the physical nature of the external storage subsystem can be transparent to the operating system and to the applications executing on the computer processor accessing the LSA. Thus, read and write commands sent by the computer processor to the external information storage system would be interpreted by the LSA controller and mapped to the appropriate DASD storage locations in a manner not known to the computer processor. This comprises a mapping of the LSA logical devices onto the actual DASDs of the LSA.

In an LSA, updated data is written into new logical block locations instead of being written in place. Large amounts of updated data are collected as tracks in controller memory and destaged together to a contiguous area of DASD address space called a segment. A segment is usually an integral number of stripes of a parity system such as RAID 5. As data is rewritten into new segments, the old location of the data in previously written segments becomes unreferenced. This unreferenced data is sometimes known as "garbage". If this were allowed to continue without taking any action, the entire address space would eventually be filled with segments which would contain a mixture of valid (referenced) data and garbage. At this point it would be impossible to destage any more data into the LSA because no free log segments would exist into which to destage data.

To avoid this problem, a process known as "Free Space Collection" (FSC) or "Garbage Collection" must operate upon the old segments. FSC collects together the valid data from partially used segments to produce completely used segments and completely free segments. The completely free segments can then be used to destage new data. In order to perform free space collection, data structures must be maintained which count the number of garbage and referenced tracks in each segment and potentially also statistics which indicate the relative rate of garbage accumulation in a segment. (See "An Age Threshold Scheme for Garbage Collection in a Log Structured Array" Jai Menon, Larry J Stockmeyer. IBM Research Journal 10120.)

Snapshot copy is a facility that is commonly supported by LSA subsystems. Snapshot copy describes a system by which the LSA directory is manipulated so as to map multiple areas of the logical address space onto the same set of physical data on DASDs. This operation is performed as an "atomic event" in the subsystem by means of locking. Either copy of the data can subsequently be written to without affecting the other copy of the data (a facility known as copy on write).

Snapshot copy has several benefits to the customer: (1) It allows the capture of a consistent image of a data set at a point in time. This is useful in many ways including backup and application testing and restart of failing batch runs. (2) It allows multiple copies of the same data to be made and individually modified without allocating storage for the set of data which is common between the copies.

In existing storage subsystems, a redundant storage subsystem is often constructed from a pair of storage controller processors which share a common pool of DASDs to which they are both connected and the pair of controllers support a same set of logical upstream devices. Each storage controller processor typically comprises the following components. (a) An upstream communication channel to the host computer(s). (b) A non-volatile memory into which data written from the host computer may be stored between the time that completion status for the write is given to the host computer and the time that the data is committed to a DASD for long term storage. (c) Some stored programs which operate upon host data so as to transform and or replicate it in some way. Examples are RAID modules, LSA modules, compression modules. (d) Connections to a pool of DASDs used for the long term storage of data.

The storage controllers communicate with each other via some means to: (1) co-ordinate the management of the DASDs and any RAID arrays build upon them; (2) replicate "Fast Write Cache" data; and (3) co-ordinate accesses from multiple hosts so that operations are applied to the stored data in the correct order to maintain the integrity of the data.

In this way, the controllers can share the workload from the host computers and co-operate with each other in order to service that workload.

In the event of a failure of either controller, or a breakdown in communication either between a controller and the host or between a controller and the DASDs, the remaining controller will take over the entire workload, resulting in no loss of availability of data to the host computers.

A log structured array within a redundant storage subsystem such as the one described above presents some special factors not faced by non-LSA subsystems.

It is a trivial matter to show that the most advantageous arrangement for an LSA subsystem is for all of the DASDs attached to the controllers to be managed as a single LSA. This single massive LSA may be partitioned into individual smaller "partitions". These partitions have meaning to the host computers which may use them to partition ownership of data sets between the host computers or to group logically related data.

This single LSA arrangement eliminates skew by flattening the I/O load across all of the DASDs. This results in more concurrent transactions per second and a greater sustained bandwidth than could otherwise be obtained for accesses to a single volume. Also, the single LSA arrangement allows the free space in the LSA to be shared by all volumes.

The single LSA approach also allows for snapshot copy between any arbitrary part of any volume and any other volume. This would not be possible if the DASDs were divided into separate LSAs as snapshot copy between different LSA directories is not possible.

Maintaining a single LSA across all the DASDs connected to the controller pair has the disadvantage that the controllers must co-operate with one another in order to reference and update certain data structures. For example, they must reference and update the LSA directory, the data structure which holds free segments, the segment usage counters and any data structures maintained to allow efficient free space collection It will be obvious to those skilled in the art that the co-ordination of these complex interrelated data structures in what is essentially a loosely coupled multiprocessing (LCMP) system involves both significant complexity and also significant locking, which introduces overhead into the I/O path and thus reduces system throughput and increases service time.

DISCLOSURE OF THE INVENTION

An aim of the invention is to provide an LSA in a storage subsystem comprising two or more storage controllers operating together in a redundant "no single point of failure" configuration controlling a shared set of DASDs.

According to a first aspect of the present invention there is provided a data storage system comprising at least two controllers and a storage device with data storage space which is shared by the controllers, wherein the controllers share the workload by dividing the shared storage space into n sets of stripes where the space in each set of stripes is designated to one controller and the stripes are sufficiently small to divide the workload uniformly across the storage device. In a preferred case, n is equal to the number of controllers.

Each controller manages the data in its designated stripes. Preferably, the units of the stripes are sufficiently small so that each portion of a host workload spans multiple stripes.

In the case of two controllers, the shared storage space may be divided into stripes of odd and even tracks, all odd tracks being processed by one controller and all even tracks being processed by the other controller.

The data storage system optimally includes a processor and memory, and the data storage device is an array of storage devices having a plurality of data blocks organized on the storage devices in segments distributed across the storage devices, wherein when a data block in a segment stored on the storage devices in a first location is updated, the updated data block is assigned to a different segment, written to a new storage location, and designated as a current data block, and the data block in the first location is designated as an old data block, and having a main directory, stored in memory, containing the locations of the storage devices of the current data blocks.

Optimally, the data storage system is a log structured array and the storage device is a plurality of direct access storage devices. The log structured array may use check data in a storage device formed of an array of direct access storage devices.

Preferably, write operations are mirrored to the other, or at least one other, controller for redundancy. Each controller may have a primary cache for the data from stripes designated to that controller and a secondary cache for data from stripes designated to another controller.

If one controller fails then another controller can take over the entire workload keeping the data structures separate so that the workload can be moved back when the failing controller has been repaired.

Each controller may have a directory providing location information for data in stripes designated to that controller. Free space collection may be carried out separately by each controller for data in stripes designated to that controller.

There is no contention between the controllers for access to the storage, the directories or the meta-data and no locking is required.

According to a second aspect of the present invention, there is provided a method of storing data in a system in which at least two controllers share storage space comprising dividing the shared storage space into n sets of stripes where the space of each stripe is designated to one controller, wherein the stripes are sufficiently small to divide the workload uniformly across the storage space.

The problem addressed by the present invention is to use two or more controllers to provide access to the same storage devices without large locking overheads. The invention achieves this and also avoids read cache duplication and divides the workload evenly between the controllers.

BRIEF DESCRIPTION OF THE DRAWINGS

An embodiment of the present invention will now be described, by way of example only, with reference to the accompanying drawings in which.

DESCRIPTION OF THE PREFERRED EMBODIMENTS

For the purposes of a detailed illustration of a particular embodiment of the present invention, a log structured array with a RAID 5 storage array is described; however, the present invention can apply equally to all other forms of log structured arrays.

Figure 1:
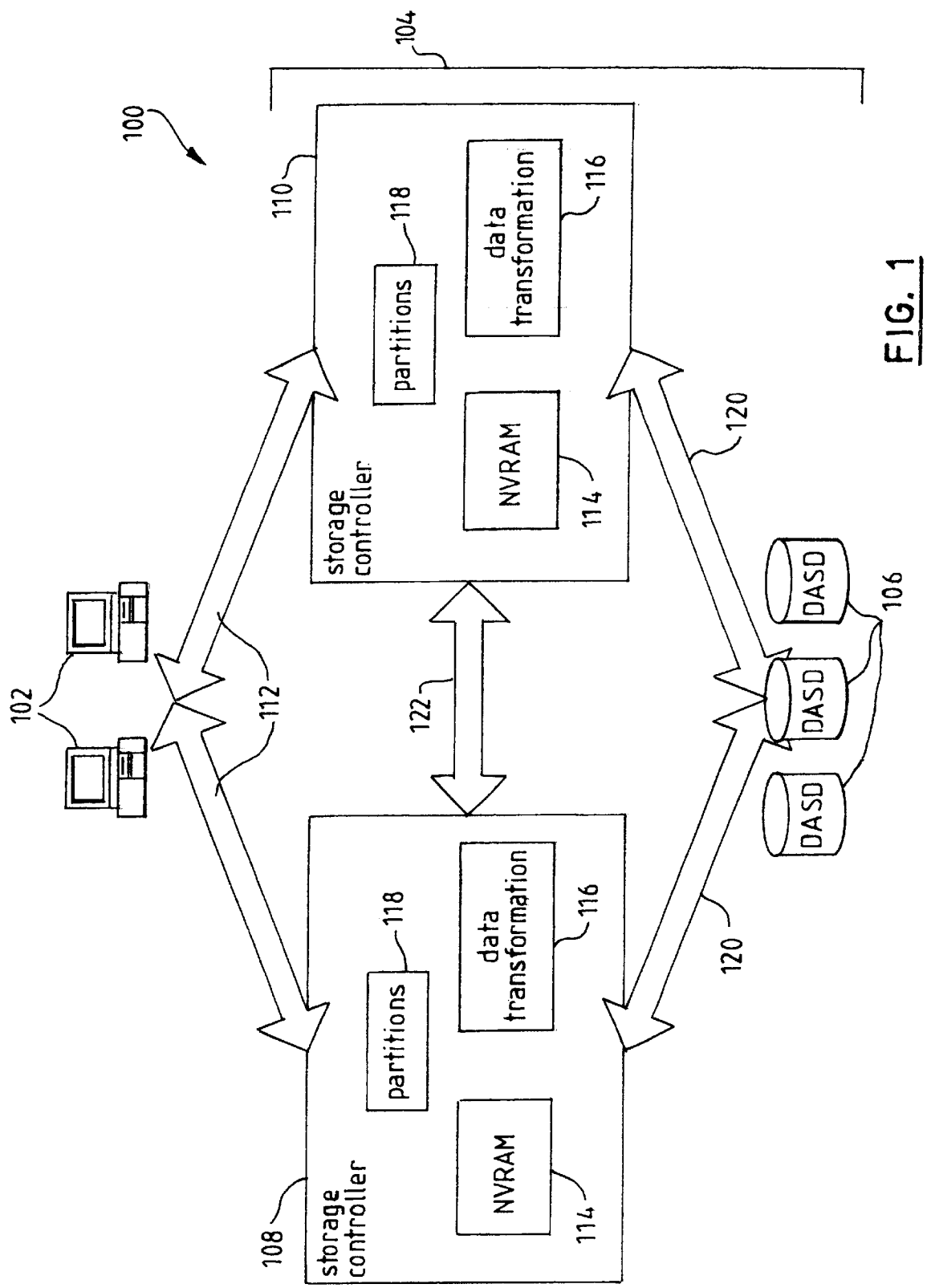
FIG. 1 is a representation of a computer system constructed in accordance with the present invention.

FIG. 1 shows a preferred embodiment of a computer system 100 constructed in accordance with the present invention. The system 100 includes one or more host computers 102 that communicate with an external information storage system 104 having a plurality of direct access storage devices (DASDs) 106 in which information is maintained as a log structured array (LSA). In FIG. 1, an array 106 comprising three DASDs 106 is shown for illustration, but it should be understood that the DASD array 106 might include a greater or lesser number of DASDS. Two controllers 108, 110 control the storage of information so that the DASD array 106 is maintained as an LSA.

In this embodiment, the storage system 104 has two controllers 108, 110 although it will be appreciated by a person skilled in the art that more than two controllers can be used, for example, a group of three or more controllers co-operating as a redundant LCMP. The two controllers 108, 110 share a pool of DASDs 106 and the controllers 108, 110 communicate with the pool of DASDs 106 via data buses 120.

Each controller 108, 110 comprises: (a) an upstream communication channel 112 to the host computer(s) 102; (b) a non-volatile memory 114 into which data written from the host computer 102 may be stored between the time that completion status for the write is given to the host computer 102 and the time that the data is committed to a DASD 106 for long term storage; (c) some stored programs 116 which operate upon host data so as to transform and or replicate it in some way, examples are RAID modules, LSA modules, compression modules; and (d) connections 106 to a pool of DASDs 106 used for the long term storage of data.

The data in the LSA controllers 108, 110 is partitioned into individual smaller logical devices or "partitions" 118. These partitions 118 have meaning to the host computers 102 which may use them to partition ownership of data sets between the host computers 102 or to group logically related data.

The controllers 108, 110 communicate with each other via some means 122 to: (1) co-ordinate the management of the DASDs 106 and any RAID arrays built upon them, as described in detail below; (2) replicate "Fast Write Cache" data; and (3) co-ordinate accesses from multiple host computers 102 so that operations are applied to the stored data in the correct order to maintain the integrity of the data.

The recording area in the DASDs 106 is divided into multiple segment-column areas and all like segment-columns from all the DASDs comprise one segment's worth of data. The controllers 108, 110 manage the transfer of data to and from the DASD array 106 so that periodically segments are considered for free space and target segments are selected according to some form of algorithm, e.g. the greedy algorithm, the cost-benefit algorithm or the age-threshold algorithm all as known from the prior art.

The host computers 102 include (not illustrated): one or more central processor units, such as a microprocessor, to execute programming instructions; random access memory (RAM) to contain application program instructions, system program instructions, and data; and an input/output controller to respond to read and write requests from executing applications. The host computers 102 may be coupled to local DASDs (not illustrated) in addition to being coupled to the external storage system in the form of the LSA 104. Typically, an application program executing in a host computer 102 may generate a request to read or write data, which causes the operating system of the host computer 102 to issue a read or write request, respectively, to the LSA controllers 108, 110.

When a host computer 102 issues a read or write request, the request is sent from the host computer to the controllers 108, 110 over a data bus 112. The controllers 108, 110 include microcode that emulates one or more logical devices or partitions so that the physical nature of the external storage system (the DASD array 106) is transparent to the host computer 102. Thus, read and write requests sent from the host computer 102 to the storage system 104 are interpreted and carried out in a manner that is otherwise not apparent to the host computer 102.

The smallest unit of data that can be written by the host computer 102 is called a track. As the controllers 108, 110 maintain the stored data as an LSA, over time the location of a logical track in the DASD array 106 can change. The controllers 108, 110 have directories with an entry for each logical track, to indicate the current DASD location of each logical track. Each LSA directory entry for a logical track includes the logical track number and the physical location of the track, for example the segment the track is in and the position of the track within the segment, and the length of the logical track in sectors. At any time, a track is live, or current, in at most one segment.

As data writing proceeds to the DASD in this manner, the DASD storage in the LSA becomes fragmented. That is, after several sequences of destaging operations, there can be many DASD segments that are only partially filled with live tracks and otherwise include dead tracks.

The writing process described above will eventually deplete the empty segments in the DASD array 106. A free space collection process must then be performed to create empty segments. Free space collection is carried out by choosing a certain number of partially-filled target segments in DASDs 106 and compacting the live tracks in these segments into a fewer number of full segments, thereby creating empty segments. For example, if free space collection is performed on three partially empty segments, and each has a 2/3 utilization rate, then the live tracks can be collected and reorganized into two full segments and one completely empty segment that is ready to receive new data. Thus, a net increase of one empty segment is created by the free space collection process. To ensure that an empty segment is always available in the DASD array 106, the controllers 108, 110 periodically perform the free space collection process on segments in the LSA. The free space collection process is typically a low priority, background process.

The data structures are divided between the controllers 108, 110 by striping them. Thus, one controller is denoted the "Even" controller and the other the "Odd" controller. The tracks in the LSA 104 are divided up into an even and odd sets as are the segments. Under normal operating conditions, each controller 108, 110 is responsible for its own set of tracks and segments.

If one controller 108, 110 should fail then the remaining controller 108, 110 can take over the entire workload, but will continue to keep the data structures separate so that the workload can be moved back when the failing controller 108, 110 is repaired.

Figure 2:
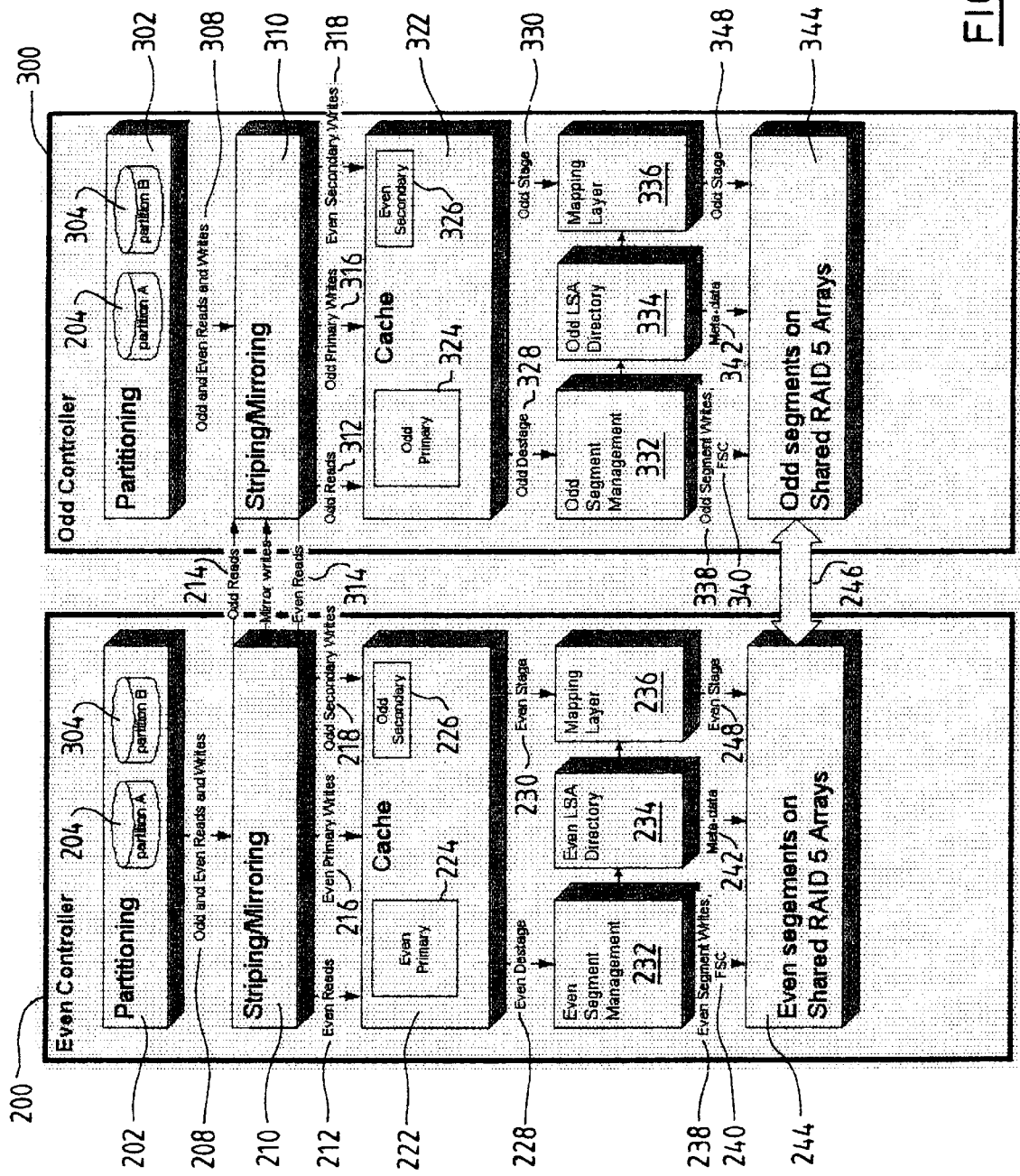
FIG. 2 is a block diagram representation of the controller operation of the computer system illustrated in FIG. 1.

Referring to FIG. 2, a more detailed description will now be given of the divided operation of two controllers, an even controller 200 and an odd controller 300.

The controllers 200, 300 each have an uppermost layer 202, 302 which presents a set of logical devices or partitions, for example, partition A 204 and partition B 304 to the host computers. Either controller 200, 300 may be accessed in order to perform a read or write operation of a partition 204, 304. These partitions 204, 304 have meaning to the host computers which may use them to partition ownership of data sets between the host computers or to group logically related data.

All read and write requests are communicated in both of the controllers 200, 300 via paths 208, 308 to a mirroring striping layer 210, 310 in each controller 200, 300.

The mirroring striping layers 210, 310 divide read and write operations up into tracks and identifies odd and even tracks in the operation.

In the case of the even controller 200, the mirroring striping layer 210 divides read and write operations into tracks and identifies odd and even tracks. Even read tracks are passed 212 to the underlying layers in the even controller 200. Odd read tracks are forwarded 214 to the odd controller 300 via a communication means between the even and odd controllers 200, 300.

Even write tracks are even primary writes in the even controller 200 and these are passed 216 to the underlying layers of the even controller 200. The even write tracks are also mirrored 218 to the mirroring striping layer 310 of the odd controller 300 as even secondary writes which are passed 318 to the cache 322 of the odd controller 300.

In the case of the odd controller 300, the mirroring striping layer 310 divides read and write operations into tracks and identifies odd and even tracks. Odd read tracks are passed 312 to the underlying layers in the odd controller 300. Even read tracks are forwarded 314 to the even controller 200 via a communication means between the even and odd controllers 200, 300.

Odd write tracks are odd primary writes in the odd controller 300 and these are passed 316 to the underlying layers of the odd controller 300. The odd write tracks are also mirrored 318 to the mirroring striping layer 210 of even controller 200 as odd secondary writes which are passed 218 to the cache 222 of the even controller 200.

In this way, each controller 200, 300 forwards reads for tracks owned by the peer controller to the other controller and passes reads for tracks owned by itself to its underlying layers. Each controller 200, 300 forwards writes for all tracks to the peer controller.

The next underlying layer in each of the controllers 200, 300 is a cache component 222, 322. The cache component 222, 322 of each controller 200, 300 maintains a combined read/write "primary" cache for locally owned tracks. The cache component 222, 322 also has a "secondary" cache which holds tracks which are dirty in the peer controller's primary cache. This secondary cache is used solely for recovery following controller failure.

For example, the cache component 222 in the even controller 200 has an even primary cache 224 containing even tracks. The cache component 222 of the even controller 200 also has an odd secondary cache 226 which contains odd tracks which are dirty in the odd controller's cache component 322. If the odd controller 300 fails, odd track data can be recovered from the odd secondary cache 226 in the even controller 200.

In the same way, the cache component 322 in the odd controller 300 has an odd primary cache 324 containing odd tracks. The cache component 322 of the odd controller 300 also has an even secondary cache 326 which contains even tracks which are dirty in the even controller's cache component 222. If the even controller 200 fails, even track data can be recovered from the even secondary cache 326 in the odd controller 300.

The next underlying layer of each of the controllers 200, 300 contains data structures in the form of a segment management component 232, 332, an LSA directory 234, 334, and a mapping layer 236, 336.

The segment management component 232, 332 is responsible for processing destages by creating new log segments which are written to the DASDs. In the case of the even controller 200, the even segment management component 232 processes even tracks which are destaged 228 from the even primary cache 224. The even writes are arranged in a new even segment which is written 238 to the DASDs. Free space collection is the process carried out in log structured storage systems in which free space or "garbage" is collected from locations in segments in which the free space has arisen from the rewriting of the data in those locations. The remaining live data in the segments is collected together and destaged as a new full segment. The collected free space from the segments forms empty segments in which data can be written. The even segment management component 232 is responsible for managing the ageing of even segments on the DASDS for free space collection 240 and maintaining a pool of free segments.

In the case of the odd controller 300, the odd segment management component 332 processes odd tracks which are destaged 328 from the odd primary cache 324. The odd writes are arranged in a new odd segment which is written 338 to the DASDS. The odd segment management component 332 is responsible for managing the ageing of odd segments on the DASDs for free space collection 340 and maintaining a pool of free segments.

In this way, odd and even segments are managed separately on the different controllers 200, 300.

The mapping layer 236, 336 performs directory lookups for stage operations. Even stage operations are forwarded 230 by the cache component 222 to the even mapping layer 236 which performs a directory lookup and processes the operation 248 to the DASDS. Odd stage operations are forwarded 330 by the cache component 322 to the odd mapping layer 336 which performs a directory lookup and processes the operation 348 to the DASDs.

Each of the controllers 200, 300 has its own LSA directory 234, 334. In this way, the LSA directory is split into odd and even parts 234, 334. The LSA directory 234 in the even controller 200 contains the directory information for the even tracks. The LSA directory 334 in the odd controller 300 contains the directory information for the odd tracks.

The LSA directories 234, 334 have an entry for each logical track, to indicate the current location in the DASDs of each logical track. Each LSA directory entry for a logical track includes the logical track number, the segment the track is in and the segment position, and the length of the logical track in sectors.

The LSA directories 234, 334 are referenced and updated by the segment management components 232, 332 and each time a segment is destaged to the DASDs, the LSA directory is updated for the tracks in the new segment. When a segment is free space collected, the live tracks in the segment are compacted by being written to a new segment and their entries in the LSA directory are updated. The LSA directories 234, 334 are referenced by the mapping layers 236, 336 to located tracks for stage operations. The LSA directories 234, 334 also exchange meta-data 242 with the storage segments of the DASDs.

The arrays of DASDs to which the data is written for storage are shared 246 by the even and odd controllers 200, 300. In this embodiment of an LSA, the DASDs are in the form of RAID 5 (redundant array of inexpensive disks) arrays. No locking should be required because there is no contention between the even and odd controllers 200, 300 for access to RAID even and odd stripes 244, 344. Since segments are integral multiples of the RAID stripe size and segments are not shared between controllers 200, 300 it follows that RAID stripes are not shared and hence no inter-controller locking is required during writes.

The described embodiment uses striping by even and odd parity. It is clear that other forms of striping may be used, particularly if more than two controllers are used. For example, if three controllers are used the striping could be a three-way division.

The benefits of this dividing approach to controllers are listed below.

All the RAID arrays can be in a single LSA. Thus, skew is flattened across all RAID arrays, improving throughput for most workloads which tend to be skewed. There is a single pool of free space thereby eliminating free space allocation concerns for the system administrator. Snapshot copies may be made freely between all parts of the LSA space.

Each controller keeps in memory only half of the overall LSA directory. This reduces the memory requirement, making more memory available for the cache, where it can improve system throughput and reduce average access time. This also reduces the I/O load on the DASDs which would otherwise have to be kept synchronised with both copies of the directory. This eliminates any lock traffic which would be required to keep the two copies of the directory synchronised. This simplifies the design, making the code simpler and thus reduces the time to market.

The I/O workload is evenly balanced between the controllers. Thus all of the available processing power and controller resources can be brought to bear on any skewed workload at all times.

The free space collection (FSC) workload is evenly balanced between the controllers. As the LSA crosses the 70% space used threshold the FSC overhead begins to climb non-linearly. At high usage levels, balancing FSC between the controllers will result in significantly improved performance.

Free segments themselves are balanced evenly between the controllers. No complex scheme for passing free segments between the controllers is needed.

No inter-controller locks are required to synchronise access to the directory, the writing of parity and data by the RAID 5 module, or any of the per-segment data structures mentioned earlier. Inter-controller locks can be expensive in terms of processor usage and thus reduce the overall system throughput.

In cache, there is no duplication of clean data, it resides only on the controller which owns the data. Dirty data must be duplicated for redundancy but it is clear which controller will destage the data. Better usage is made of the cache memory resulting in an effectively larger cache.

The prior art solutions partition work between controllers, allocating whole arrays to each controller. This means partitioning the data sets, and hence the workload, between two (or more) controllers and their corresponding arrays. This denies the system the opportunity to spread the work across all the drives of the system.

The aim of the present invention is to allocate array space between controllers on a basis that is significantly less than a whole array. The granularity of the allocation/management unit must be sufficiently small so that each portion of the customer workload tends to span multiple units.

The mechanism described partitions the work on the basis of parity of the track number. The management of I/O based on parity is no more complex than existing systems, but it has the advantage of naturally splitting the host workload evenly across all arrays. The partitioning scheme is based purely on some artificial/logical construct which the controllers understand. This is significantly different to basing it on the physical underlying arrays.

The precise scheme for allocating the units is not significant, provided it is consistently and easily calculated by all controllers and it gives a high probability that neighbouring units are allocated to different controllers.

Modifications and improvements can be made to the foregoing without departing from the scope of the present invention.

What is claimed is:

1. A data storage system comprising at least two controllers and a storage device with data storage space which is shared by the controllers, wherein the controllers share the workload by dividing the shared storage space into n sets of stripes where the data storage space in one set of stripes is designated to one controller and each stripe is sufficiently small to divide the workload uniformly across the storage device, said at least two controllers comprising an interface for being coupled to at least one host for receiving read and write requests from the at least one host, said at least two controllers being communicatively coupled together for allocating amongst themselves received read and write requests in accordance with the set of stripes designated to each controller for executing the received read and write requests in a manner that is transparent to the at least one host.

2. A data storage system as claimed in claim 1, wherein each controller manages the data in its designated stripes.

3. A data storage system as claimed in claim 1, wherein n is equal to the number of controllers.

4. A data storage system as claimed in claim 1, wherein each stripe is sufficiently small so that each portion of a host workload spans multiple stripes.

5. A data storage system as in claim 1, where said at least two controllers manage said data storage space as a log structured array, and where each controller is responsible for garbage collection only within those tracks found in the set of the stripes that is assigned to that controller.

6. A data storage system as claimed in claim 1, wherein the storage system further includes a processor and memory, and the data storage device is an array of storage devices having a plurality of data blocks organized on the storage devices in segments distributed across the storage devices, wherein when a data block in a segment stored on the storage devices in a first location is updated, the updated data block is assigned to a different segment, written to a new storage location, and designated as a current data block, and the data block in the first location is designated as an old data block, and having a main directory, stored in said memory, containing the locations of the storage devices of the current data blocks.

7. A data storage system as claimed in claim 6, wherein the data storage system is a log structured array and the storage device is a plurality of direct access storage devices.

8. A data storage system as claimed in claim 7, wherein the log structured array uses check data in a storage device of an array of direct access storage devices.

9. A data storage system as claimed in claim 6, wherein write operations are mirrored to the other, or at least one other, controller for redundancy.

10. A data storage system as claimed in claim 6, wherein each controller has a primary cache for the data from stripes designated to that controller and a secondary cache for data from stripes designated to another controller.

11. A data storage system as in claim 10, where said primary cache stores data related to tracks found in the set of the stripes that is assigned to the controller, and said secondary cache stores data related only to dirty tracks found in the primary cache of said another controller, said controller being responsive to a failure of said another controller for using data stored in said secondary cache for error recovery.

12. A data storage system as in claim 10 where one controller is assigned a set of stripes corresponding to even tracks, and where the other controller is assigned a set of stripes corresponding to odd tracks, where each controller is responsive to a received read request for executing the read request if it pertains to a track in the assigned set of stripes and for otherwise forwarding the read request to the other controller, and where each controller is responsive to a received write request for executing the write request if it pertains to a track in the assigned set of stripes and for also forwarding all write requests for both even tracks and odd tracks to the other controller, where if the write request pertains to a track of a non-assigned set of stripes for the other controller, it is recorded in said secondary cache of said other controller.

13. A data storage system as claimed in claim 6, wherein if one controller fails then another controller takes over the entire workload keeping the data structures separate so that the workload can be moved back when the failing controller is repaired.

14. A data storage system as claimed in claim 1, wherein each controller has a directory providing location information for data in stripes designated to that controller.

15. A data storage system as claimed in claim 1, wherein free space collection is carried out separately by each controller for data in stripes designated to that controller.

16. A data storage system as claimed in claim 1, wherein there is no contention between the controllers for access to the storage space, the directories or the meta-data and no locking is required.

17. A method of storing data in a system in which at least two controllers share storage space comprising dividing the shared storage space into n sets of stripes where the storage space of one set of stripes is designated to one controller, wherein each stripe is sufficiently small to divide the workload uniformly across the storage space, where the at least two controllers are coupled to at least one host for receiving read and write requests therefrom, said at least two controllers being communicatively coupled together for allocating amongst themselves received read and write requests in accordance with the set of stripes designated to each controller for executing the received read and write requests in a manner that is transparent to the at least one host.

18. A method of storing data as claimed in claim 17, wherein each controller manages the data in its designated stripes.

19. A method of storing data as claimed in claim 17, wherein n is equal to the number of controllers.

20. A method of storing data as claimed in claim 17, wherein each stripe is sufficiently small so that each portion of a host workload spans multiple stripes.

21. A method of storing data as claimed in claim 17, wherein the storage system further includes a processor and memory, and the data storage device is an array of storage devices having a plurality of data blocks organized on the storage devices in segments distributed across the storage devices, wherein when a data block in a segment stored on the storage devices in a first location is updated, the updated data block is assigned to a different segment, written to a new storage location, and designated as a current data block, and the data block in the first location is designated as an old data block, and having a main directory, stored in said memory, containing the locations of the storage devices of the current data blocks.

22. A method of storing data as claimed in claim 21, wherein the shared storage space is a log structured array with a plurality of direct access storage devices.

23. A method of storing data as claimed in claim 22, wherein the log structured array uses check data in a storage device of an array of direct access storage devices.

24. A method of storing data as claimed in claim 17, wherein write operations are mirrored to the other, or at least one other, controller for redundancy.

25. A method of storing data as claimed in claim 17, wherein each controller has a primary cache for the data from stripes designated to that controller and a secondary cache for data from stripes designated to another controller.

26. A method of storing data as claimed in claim 17, wherein if one controller fails then another controller takes over the entire workload keeping the data structures separate so that the workload can be moved back when the failing controller is repaired.

27. A method of storing data as claimed in claim 17, wherein location information is provided in each controller by a directory for data in stripes designated to that controller.

28. A method of storing data as claimed in claim 17, wherein free space collection is carried out separately by each controller for data in stripes designated to that controller.

29. A method of storing data as claimed in claim 17, wherein there is no contention between the controllers for access to the storage space, the directories or meta-data and no locking is required.

30. A data storage system comprising at least two controllers and a storage device with data storage space which is shared by the controllers, wherein the controllers share the workload by dividing the shared storage space into n sets of stripes where the data storage space in one set of stripes is designated to one controller and each stripe is sufficiently small to divide the workload uniformly across the storage device, wherein there are two controllers and the shared storage space is divided into stripes of odd and even tracks, all odd tracks being processed by one controller and all even tracks being processed by the other controller.

31. A method of storing data in a system in which at least two controllers share storage space comprising dividing the shared storage space into n sets of stripes where the storage space of one set of stripes is designated to one controller, wherein each stripe is sufficiently small to divide the workload uniformly across the storage space, wherein there are two controllers and the method comprises dividing the shared storage space into stripes of odd and even tracks and processing all odd tracks by one controller and processing all even tracks by the other controller.

* * * * *